Patented Feb. 4, 1947

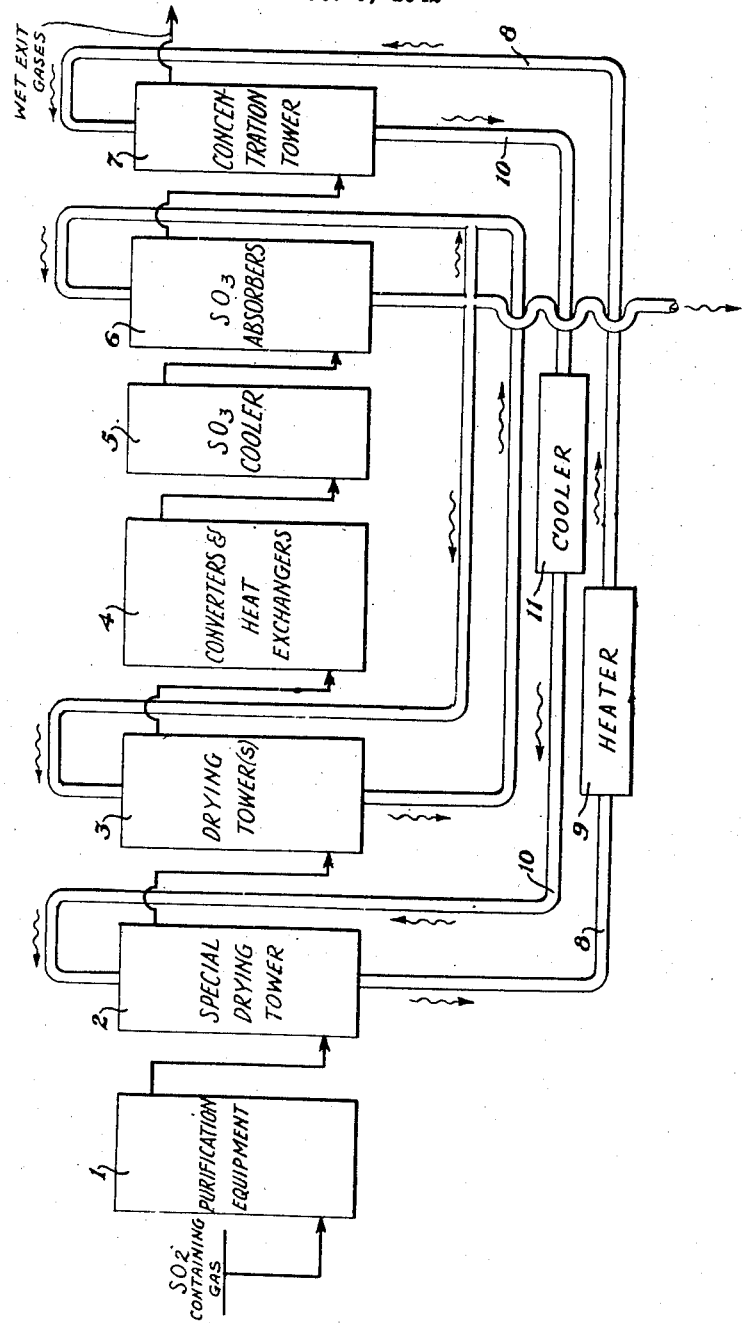

2,415,142

UNITED STATES PATENT OFFICE 2,415,142

MANUFACTURE OF HIGH STRENGTH SULFURIC ACID

Ivan Roy McHaffie, Montreal West, Quebec, and Harvey Richard Lyle Streight, Montreal, Quebec, Canada, assignors to E. I. du Pont de Nemours and Company, Wilmington, Del., a corporation of Delaware Application October 6, 1942, Serial No. 460,952
In Canada April 9, 1942

8 Claims. (Cl. 23—175)

This invention relates to the manufacture of oleum and high strength sulfuric acid by the contact process and is particularly directed to the utilization of dry waste gases issuing from the system in reducing the moisture content of wet gases entering the system.

In the conventional operation of a contact plant the moisture content of the raw sulfur dioxide containing gas obtained by combustion of a sulfur bearing raw material with air is reduced prior to conversion of the sulfur dioxide to sulfur trioxide by cooling the gas followed by scrubbing, usually in a series of drying towers, with sulfuric acid solution of a progressively increasing concentration. In certain instances it may be desirable to reduce the moisture content of the air prior to entering the combustion chamber and this can likewise be effected by first passing it through the drying tower unit. In either event, however, the moisture removed by the drying tower acid from the inlet air or sulfur dioxide containing gas eventually enters the acid produced in the system since the acid from the drying tower unit normally serves as a supply for the make-up acid in the absorber unit of the plant. Because of such variable factors as climatic conditions and the temperature of the cooling water available at the plant, the moisture content of the gas passing through the drying tower is sometimes high enough to cause such a dilution of the drying tower acid that it is impossible to produce a high strength acid such as 30 or 40% oleum when all the diluted drying acid is blended with the acid produced in the sulfur trioxide absorbers. This occurs more frequently during the summer months when high humidity conditions and high cooling water temperatures prevail and is especially the case when large volumes of air are required for combustion purposes or for efficient catalyst operation in the converters. Thus, more air is required, for example, for the combustion of pyrites than is necessary for the combustion of elemental sulfur, while use of a vanadium catalyst necessitates a larger volume of air than when a platinum catalyst is used. Accordingly, to obtain acid strengths such as those mentioned above, it becomes necessary to remove from the system the excess of moisture over that required to produce the desired strength acid.

This has heretofore been accomplished by the use of either equipment such as a concentration unit to increase the strength of the acid from the drying tower or equipment adapted to concentrate the raw sulfur dioxide containing gas. These methods, however, require the use of additional apparatus of a highly specialized construction and the use of a concentration unit also requires a considerable amount of heat and power, all of which factors increase capital outlay and operating cost per unit of product.

Accordingly, it is an object of this invention to provide an efficient and economical process for the removal of moisture from a sulfuric acid contact system. Another object is to provide a process for the removal of moisture from wet gases entering such a system. A further object is to provide a process for the removal of moisture from a wet sulfur dioxide containing gas prior to conversion of the sulfur dioxide to sulfur trioxide. A still further object is to provide a method whereby the strength of the acid produced in the system can be readily controlled. These and other objects of the invention will become apparent as the description proceeds.

Briefly stated, these objects are accomplished by removing water in two stages from the gas normally passing through the drying tower unit. In a special drying tower a portion of the water vapor content of the gas is removed with sulfuric acid of controlled strength and temperature, while in the regular tower unit the bulk of the remaining water is removed from the gas according to standard practice. The strength of the acid circulating through the special drying tower is controlled by delivering the diluted exit acid to a concentration tower where water is removed by passing the acid down the tower counter-current to the dry exit gases issuing from the contact plant, following which the acid from the concentration tower is returned to the special drying tower while the water removed in the concentration tower is discharged to the atmosphere with the exit gases. A more complete understanding of the sequence of operations may be had by reference to the accompanying drawing which illustrates a flow sheet of a typical process according to our invention.

As will be noted from this drawing a sulfur dioxide containing gas obtained from any desired source is first passed through the conventional purification equipment 1. The wet sulfur dioxide containing gas then passes to the special drying tower 2 mentioned above through which sulfuric acid of controlled concentration and temperature is circulated. From the special drying tower 2, the sulfur dioxide containing gas passes to the regular drying tower unit 3 and thence through the converters and heat exchangers 4, sulfur trioxide cooler 5 and absorber units 6 in the conventional manner but the waste exit gases which normally pass to atmosphere are instead passed into a concentration tower 7 through which the acid from the special drying tower 2 is circulated. Since the waste exit gases normally issue from the system at relatively high temperatures and are dry after passing through the sulfur trioxide absorber units 6, water is removed from the acid circulating through the concentration tower 7 through evaporation by the hot exit gases, following which the acid from the concentration tower 7 is returned to the special drying tower 2 while the wet exit gases pass to the atmosphere. For maximum efficiency of operation, the amount of water evaporated in the concentration tower should equal the amount of water removed from the wet gas in the special drying tower.

Since the amount of water removed from the system governs the final strength of acid produced, it is obvious that, to increase the strength of the final product, it will be necessary to increase the amount of water being removed from the system. This can be accomplished by controlling the temperature of the acid being cycled from one tower to the other through the insertion of a cooler 11 in the acid line 10 from the concentration tower 7 to the special drying tower 2 and a heater 9 in the acid line 8 from the special drying tower 2 to the concentration tower 7, substantially as shown in the accompanying drawing. The insertion of the cooler will increase the difference between the partial pressure of water in the gas stream entering the special drying tower and the equilibrium pressure of water vapor over the acid circulating through this tower while the insertion of a heater will increase the equilibrium pressure of water vapor over the acid circulating through the concentration tower with the net result that more water will be removed from the wet gas passing through the special drying tower and more water will be evaporated with the hot exit gases in the concentration tower. In practice, the use of a heater is seldom required except for starting the plant up after a long shut down.

The advantages to be derived from the practice of the present invention may be further illustrated by comparison of the results obtained when operation of the system is carried out in the conventional manner with the results obtained by operating in accordance with our improved process. Thus in a plant adapted to produce 10,000 tons per year expressed as 100% sulfuric acid, iron pyrites is burned at 90% efficiency to produce a gas containing 7.7% by volume of sulfur dioxide which is cooled in the scrubbers to 35° C., the temperature of the cooling water being 25° C. Under these conditions and using a platinum catalyst 11-12% oleum is obtained in the conventional system. However, by inserting our drying and concentration towers in the system as above described and with the temperature of the exit gases from the conventional plant at 60° C., the entire plant output is increased to 38% oleum by passing acid of 50% strength through the special drying tower, heating the acid leaving this tower to 43° C. and passing it to the concentration tower. The acid leaving the concentration is cooled to 35° C. and returned to the special drying tower, the rate of circulation of acid in both towers being 37 gallons per minute. Although acid of 50% concentration has been disclosed, the acid may vary in strength from 35% to 85%, the exact strength and rate of circulation being dependent on the conditions of operation of the system and the final strength of product desired.

While the use of pyrites as the source of sulfur dioxide gas has been described, the process may likewise be adapted to the use of any other type of sulfur containing raw material, such as elemental sulfur or brimstone, coal brasses, waste gases from copper, zinc or nickel smelters or acid sludge from petroleum refining operations.

The improved process of our invention may also be adapted to produce two or more strengths of acid instead of a single strength product as above described, the combined acid content of different strengths being higher than that which could be obtained in the conventional contact system.

Although preferably carried out in two towers as previously described, the process may also be operated with the use of additional towers or single towers may be split into two or more sections. Likewise wash scrubbers or other equipment designed to mix gases and liquids together may be used. Since the problem of design of the special drying tower and the concentration tower will vary from plant to plant, it will be apparent to those skilled in the art that such factors as the size of the towers, type of packing to be used, rate of acid flow in each tower and materials of tower construction will be dependent on the conditions encountered in the operation of each individual system. The cooling and heating systems on the acid lines may also be varied in design so long as the requisite cooling or heating of the circulating acid is obtained.

In comparison to the heretofore known methods of increasing the maximum strength of total output of acid by the contact process, the present invention provides a more efficient and economical means of achieving the desired result, both from the point of view of low operating cost per unit of product and smaller capital outlay for plant construction. The adaptability of our process to a variety of conditions is a salient feature. Thus, the process may be operated to increase the strength of the acid produced in the system as required, such as in the summer when high cooling water temperatures prevail, while if normal operation of the system is desired the circulation of acid through the special drying tower and the concentration tower can be discontinued. In addition, the use of our method can result in a reduction in the size of the coolers used to remove heat from the sulfur dioxide containing gas.

While the process of our invention has been described with particular reference to the contact system, it may also be adapted to the removal of water from gases in any other type of system providing such system normally produces a dry exit gas and that the gases entering the system can be washed with sulfuric acid or other drying medium. Thus, the process may be used for the removal of water in a sulfur dioxide concentration system or in the manufacture of chlorsulfonic acid.

As will be apparent to those skilled in the art, other modifications and variations may likewise be made in the process without departing from the spirit of our invention and consequently the scope of our invention is intended to be limited only in accordance with the appended claims.

We claim:

1. In a contact process for the manufacture of sulfuric acid, the steps which comprise passing a moist gas in counter-current flow to a dehydrating medium comprising sulfuric acid, passing the spent acid in counter-current flow to a stream of dry, waste, inert gases which issue from the system and otherwise normally pass to the atmosphere, and cycling the reconcentrated acid for further dehydration of moist gas.

2. In a contact process for the manufacture of sulfuric acid, the steps which comprise passing a moist sulfur dioxide containing gas in counter-current flow to a dehydrating medium comprising sulfuric acid, passing the spent acid in counter-current flow to a stream of dry, waste, inert gases which issue from the system and otherwise normally pass to the atmosphere, and cycling the reconcentrated acid for further dehydration of additional moist sulfur dioxide containing gas.

3. In a contact process for the manufacture of high strength sulfuric acid, the steps which comprise passing a moist sulfur dioxide containing gas in counter-current flow to a dehydrating medium comprising sulfuric acid, passing the spent acid in counter-current flow to a stream of dry, waste, inert gases which issue from the system and otherwise normally pass to the atmosphere, and cycling the reconcentrated acid for further dehydration of additional moist sulfur dioxide containing gas.

4. In a contact process for the manufacture of high strength sulfuric acid from a sulfur dioxide containing gas obtained by combustion of a sulfur bearing raw material with air, the steps which comprise passing the moist sulfur dioxide containing gas in counter-current flow to sulfuric acid of at least 35% concentration, passing the spent acid in counter-current flow to a stream of dry, waste, inert gases which issue from the system and otherwise normally pass to the atmosphere, and cycling the reconcentrated acid for further dehydration of additional moist sulfur dioxide containing gas.

5. In a contact process for the manufacture of oleum from a sulfur dioxide containing gas obtained by the combustion of iron pyrites with air, the steps which comprise passing the moist sulfur dioxide containing gas in counter-current flow to sulfuric acid of at least 35% concentration, passing the spent acid in counter-current flow to a stream of dry, waste, inert gases which issue from the system and otherwise normally pass to the atmosphere, and cycling the reconcentrated acid for further dehydration of additional moist sulfur dioxide containing gas.

6. A process for the removal of moisture from a contact sulfuric acid system which comprises passing a moist gas in counter-current flow to a dehydrating medium comprising sulfuric acid and passing the spent acid in counter-current flow to a stream of dry, waste, inert gases which issue from the system and otherwise normally pass to the atmosphere.

7. A continuous process for the removal of moisture from a contact sulfuric acid system which comprises passing a moist sulfur dioxide containing gas in counter-current flow to a dehydrating medium comprising sulfuric acid, passing the spent acid in counter-current flow to a stream of dry, waste, inert gases which issue from the system and otherwise normally pass to the atmosphere and cycling the reconcentrated acid for further dehydration of additional moist sulfur dioxide containing gas.

8. A continuous process for the removal of moisture in a contact sulphuric acid system which comprises drying the air utilized in producing sulphur dioxide for contact conversion to sulphur trioxide by means of a dehydrating medium comprising sulphuric acid, concentrating the spent dehydrating medium by contact with dry waste inert gases issuing from the system, and recycling the concentrated dehydrating medium for further dehydration of additional moist air.

IVAN ROY McHAFFIE.
HARVEY RICHARD LYLE STREIGHT.

REFERENCES CITED

The following references are of record in the file of this patent:

UNITED STATES PATENTS

| Number | Name | Date |
|---|---|---|
| 2,180,727 | Carter | Nov. 21, 1939 |
| 1,882,208 | Clark | Oct. 11, 1932 |
| 1,915,270 | Clark | June 27, 1933 |
| 2,038,429 | Hechenbleikner | Apr. 21, 1936 |
| 2,090,936 | Clark | Aug. 24, 1937 |